United States Patent
Wacke

[19]

[11] Patent Number: 6,041,512
[45] Date of Patent: Mar. 28, 2000

[54] MEASUREMENT OF CONTAINER WALL THICKNESS

[75] Inventor: Robert S. Wacke, Toledo, Ohio

[73] Assignee: Owens-Brockway Glass Container Inc., Toledo, Ohio

[21] Appl. No.: 09/005,017

[22] Filed: Jan. 9, 1998

[51] Int. Cl.[7] .............................. G01B 7/06; G01B 5/06
[52] U.S. Cl. .............................. 33/522; 33/549; 33/554
[58] Field of Search ............................ 33/522, 1 BB, 33/700, 712, 783, 784, 792, 793, 803, 804, 805, 549, 550, 551, 552, 553, 554, 555; 209/530, 531, 533; 73/865.8

[56] References Cited

U.S. PATENT DOCUMENTS

| | | | |
|---|---|---|---|
| 2,508,251 | 5/1950 | Ingle | 33/522 |
| 2,616,068 | 10/1952 | McDonald | 33/549 |
| 2,988,218 | 6/1961 | Fedorchak et al. . | |
| 3,073,034 | 1/1963 | Antoszewski . | |
| 3,239,939 | 3/1966 | Aller | 33/549 |
| 3,355,811 | 12/1967 | Tailleur . | |
| 3,400,463 | 9/1968 | Barringer | 33/554 |
| 3,769,713 | 11/1973 | Norman . | |
| 3,913,234 | 10/1975 | Windle | 33/803 |
| 4,357,754 | 11/1982 | Kent . | |
| 4,862,596 | 9/1989 | Iino et al. | 33/522 |
| 4,941,269 | 7/1990 | Mori et al. | 33/783 |
| 5,022,267 | 6/1991 | Shattuck et al. | 73/593 |
| 5,313,714 | 5/1994 | Nakao | 33/522 |
| 5,345,309 | 9/1994 | Wertz et al. | 356/372 |
| 5,465,496 | 11/1995 | Axon | 33/522 |
| 5,625,958 | 5/1997 | DeCoursey et al. | 33/555 |

FOREIGN PATENT DOCUMENTS

| | | | |
|---|---|---|---|
| 1161641 | 8/1969 | United Kingdom | 33/522 |

*Primary Examiner*—Christopher W. Fulton

[57] ABSTRACT

An apparatus for measuring sidewall thickness of a container includes a support coupled to a first motor for holding the container in stationary position while rotating the container about its axis. A gauge mechanism engages opposed interior and exterior points on the sidewall of the container, and provides an electrical signal as a function of sidewall thickness between such points. A second motor is coupled to the gauge mechanism for moving the gauge mechanism in the direction of the container axis. A controller is coupled to the first and second motors, and is responsive to the electrical signal from the gauge mechanism for obtaining and storing a three-dimensional data map of sidewall thickness at increments of motion of both the first and second motors. Thus, there is provided thickness data related to angular orientation and axial position, which can then be analyzed to identify specific problems associated with container manufacture.

47 Claims, 7 Drawing Sheets

MEASUREMENT OF CONTAINER WALL THICKNESS

The present invention is directed to measuring wall thickness of containers such as glass containers, and more particularly to a method and apparatus for measuring the sidewall and/or heel (including the load bearing surface) thickness of glass containers.

BACKGROUND AND OBJECTS OF THE INVENTION

It has heretofore been proposed to measure the sidewall thickness of a glass container by placing the container on a mandrel arm with a pivoting head. The mandrel arm is inserted through the open mouth of the container. The head has a tip that internally engages the container sidewall, and is mechanically coupled to a second arm that carries an electronic gauge. The gauge has a tip that externally engages the container sidewall opposite the point of internal engagement between the head and the inside surface of the sidewall. The mechanical coupling between the arms is such that the arms may move up and down in unison to accommodate non-circularity of the container as it is manually rotated on the mandrel without affecting the output of the electronic gauge. However, if the sidewall thickness changes between the gauge tip and the head tip, a corresponding change is indicated at the gauge. The electronic gauge includes or is coupled to circuitry for storing maximum and minimum thickness signals as the container is rotated.

Although container sidewall measurement technique so described has been employed successfully in the art, further improvements remain desirable. For example, the described technique provides maximum and minimum thickness measurements, but does not provide any indication of angular orientation of either reading. Furthermore, although the gauge elements may be selectively positioned by an operator at any desired axial location along the container sidewall, three-dimensional profile measurements cannot be readily obtained. It is also not possible, employing the described technique, to obtain a thickness measurement at the heel of the container or the load-bearing surface because of the convex contour of the container bottom within the container. It is therefore a general object of the present invention to provide a method and apparatus for automatically obtaining two-dimensional or three-dimensional profile measurements of the wall thickness of containers such as glass bottles. Another and more specific object of the present invention is to provide a method and apparatus of the described character that are adapted to obtain thickness measurements not only at the sidewall of the container, but also at the container heel and load-bearing area around the periphery of the container bottom. Another object of the present invention is to provide a method and apparatus that satisfy the foregoing objectives, and that can be readily implemented in a manufacturing environment.

SUMMARY OF THE INVENTION

Apparatus for measuring wall thickness of a container in accordance with a first aspect of the present invention includes a pair of spaced rollers mounted for free rotation, and means for holding the sidewall of a container exteriorly against the rollers and rotating the container about its central axis. A gauge mechanism includes a first portion for engaging an exterior point on the container, and a second portion for extending through the open container mouth and engaging an interior point on the container sidewall opposed to the exterior point. An electronic control rotates the container about its axis against the rollers, and is coupled to the gauge mechanism for obtaining an electrical signal indicative of sidewall thickness and storing a data map of wall thickness as a function of increments of rotation of the container. The gauge mechanism in the preferred embodiments of the invention includes a carriage mounted for motion orthogonal to the wall thickness being measured, with the first and second portions of the gauge mechanism being mounted to the carriage for conjoint motion such that variations in position of the container wall due to non-circularity of the container results in conjoint motion of the first and second portions of the gauge. The carriage preferably is supported by a spring so that the carriage is essentially free-floating.

In accordance with a second aspect of the invention, an apparatus for measuring sidewall thickness of a container includes a support coupled to a first motor for holding the container while rotating the container about its axis. A gauge mechanism engages opposed interior and exterior points on the sidewall of the container, and provides an electrical signal as a function of sidewall thickness between such points. A second motor is coupled to the gauge mechanism for moving the gauge mechanism in the direction of the container axis. A controller is coupled to the first and second motors, and is responsive to the electrical signal from the gauge mechanism for obtaining and storing a three-dimensional data map of sidewall thickness at increments of motion of both the first and second motors. Thus, rather than simply obtaining maximum and minimum thickness data with no angular position indication as in the prior art, there is provided in accordance with this aspect of the invention thickness data related to angular orientation and axial position, which can then be analyzed to identify specific problems associated with container manufacture.

In accordance with a third aspect of the invention, that portion of the gauge mechanism that extends through the open container mouth to engage the interior of the container comprises an elongated arm slidable in a tube, and a head pivotally mounted at one end of the tube. The head has a tip for engaging the interior surface of a container, and a plurality of angulated faces for engagement by the adjacent end of the arm to hold the head and tip at predetermined angular orientations associated with the angles of the faces. The opposing end of the arm is engaged by a spring under compression, and a handle extends through the wall of the tube for operator adjustment of head orientation. In this way, the head may be positioned coaxial with the arm for insertion through the mouth of a container, orthogonal to the arm for measuring radial sidewall thickness, or at an angle to the arm for measuring container heel thickness without interference from the convex interior surface of the container bottom.

In accordance with yet another aspect of the present invention, there is provided an apparatus and method for measuring the thickness of the bottom portion of the container heel that forms the load-bearing portion of the container. The container is held in vertical orientation against the rollers and rotated about its central axis. The gauge arm extends downwardly through the open container mouth, and the head is oriented at an angle to the gauge arm for engaging the interior of the load-bearing portion of the container bottom. The exterior portion of the gauge is positioned beneath the container for engaging the exterior portion of the container bottom opposite to the gauge head. As in the apparatus for measuring sidewall thickness, the gauge and gauge arm are mounted on a carriage that is supported by a spring.

BRIEF DESCRIPTION OF THE DRAWINGS

The invention, together with additional objects, features and advantages thereof will be best understood from the following description, the appended claims and the accompanying drawings in which:

DETAILED DESCRIPTION OF PREFERRED EMBODIMENTS

FIGS. 1–5 illustrate an apparatus 20 for measuring the sidewall and heel thickness of a container 22 such as a glass bottle in accordance with a presently preferred embodiment of the invention. Apparatus 20 comprises a flat rectangular base 24 having rubber feet 26 at the corners for supporting plate 24 on a suitable surface. A pair of parallel plates 28, 30 extend upwardly from opposed sides of plate 24. A pair of rollers 32, 34 are mounted between plates 28, 30 for rotation about stationary parallel axes, which are parallel to the plane of support plate 24 and preferably oriented substantially horizontally in use. A stepper motor 36 is mounted on plate 30 exteriorly adjacent to the ends of rollers 32, 34, and carries a cog 38 (FIGS. 1 and 2) that is coupled by a drive belt 40 to cogs 42 on the adjacent ends of rollers 32, 34. Thus, rollers 32, 34 rotate together under control of stepper motor 36.

Figure 4:
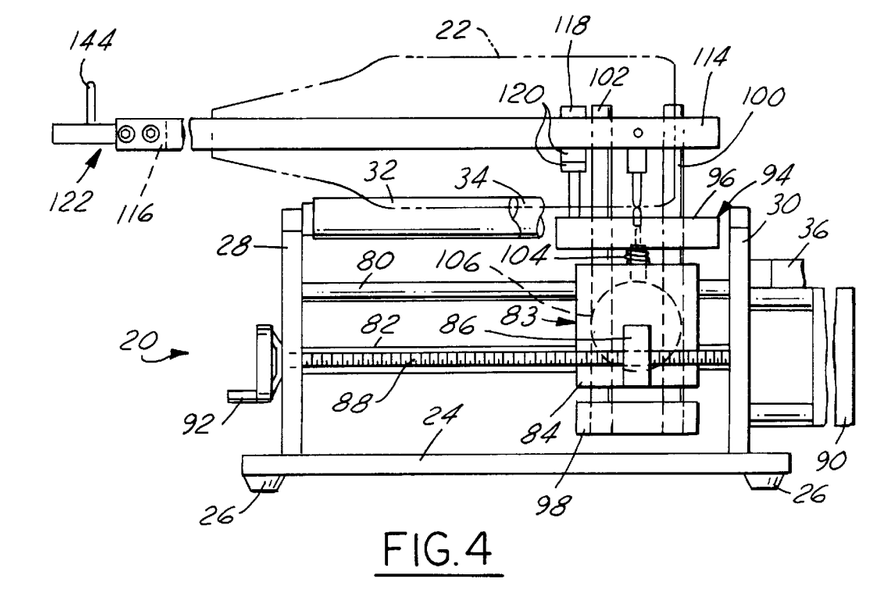
FIG. 4 is a side elevational view of the apparatus of FIGS. 1–3 from a direction opposite to that of FIG. 1.

A cross-bracket 44 (FIGS. 2 and 3) is affixed to the upper edges of plates 28, 30, and extends therebetween along an axis parallel to the axes of rollers 32, 34. A leg 46 extends upwardly from bracket 44 midway between plates 28, 30. An arm 48 is pivotally mounted to leg 46. A roller carriage assembly 50 is mounted to one end of arm 48. Roller carriage assembly 50 includes a pair of spaced end plates 52, 54 that are joined to each other by a shaft 56 that is freely pivotally mounted to the end of arm 48. A pair of rollers 58, 60 extend between and are carried by end plates 52, 54 for free rotation about axes that are parallel to each other and to the axes of rotation of rollers 32, 34. A coil spring 62 extends between a lug 64 on the lower side of arm 48 and a keeper 66 mounted on leg 46. Tension in spring 62 is adjustable by means of a wing nut 68 and a threaded pin 69 that extends through keeper 66 to spring 62. An over-center lock 70 is carried at the upper end of leg 46. Lock 70 includes a handle 72 pivotally mounted to leg 46, and a leg 74 with a rubber tip 76 for engaging the end of arm 48 remote from carriage assembly 50 for pivoting arm 48 upwardly against the force of spring 62, and thereby moving carriage assembly 50 and associated rollers 58, 60 away from fixed support rollers 32, 34.

Figure 1:
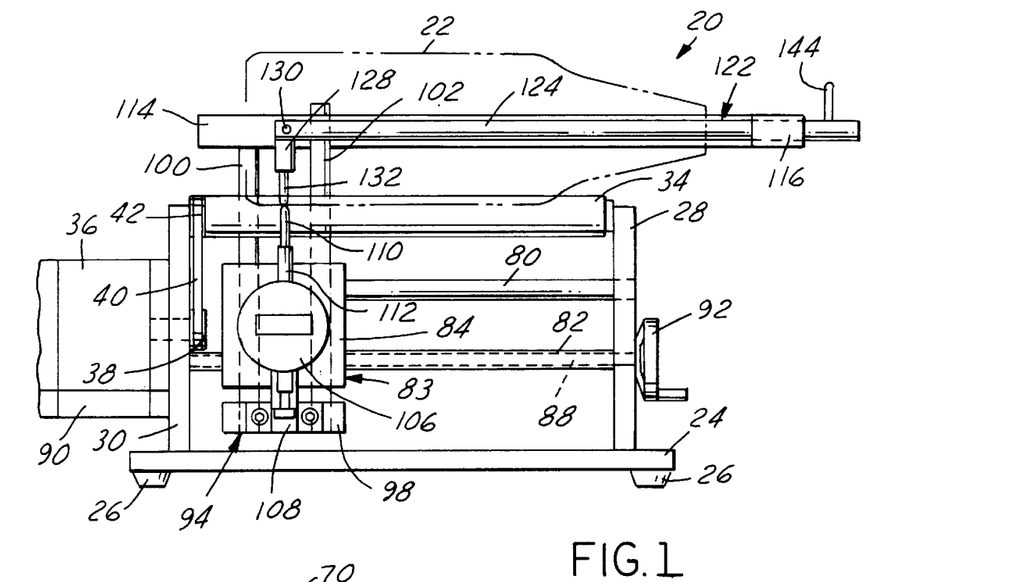
FIG. 1 is a side elevational view of an apparatus for measuring sidewall thickness of a glass container in accordance with one presently preferred embodiment of the invention.
Figure 2:
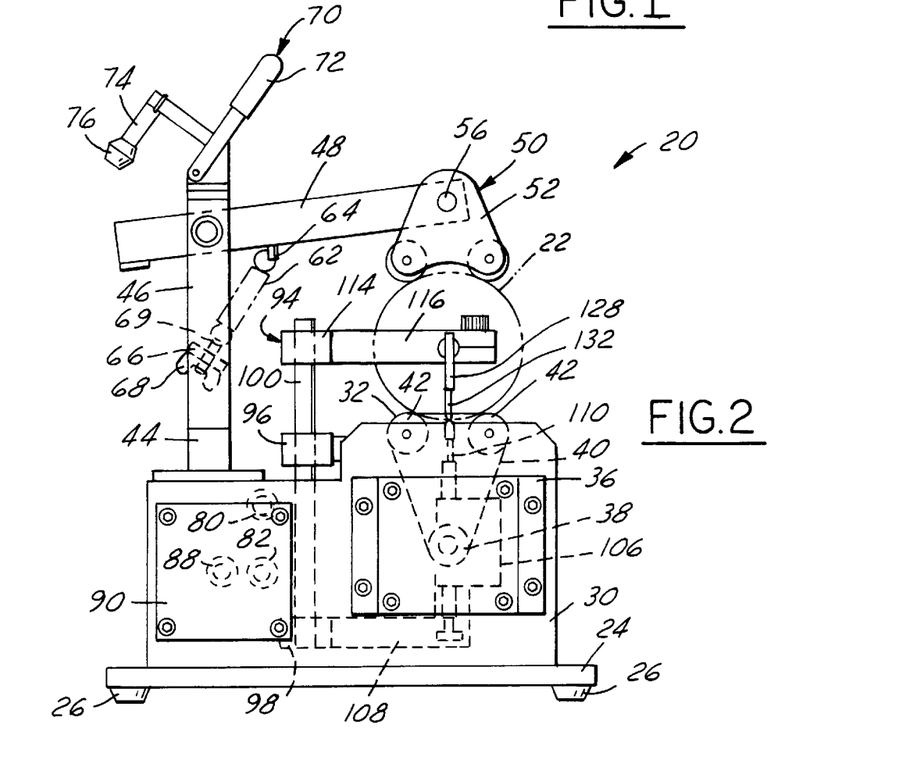
FIG. 2 is an end elevational view of the apparatus illustrated in FIG. 1.
Figure 3:
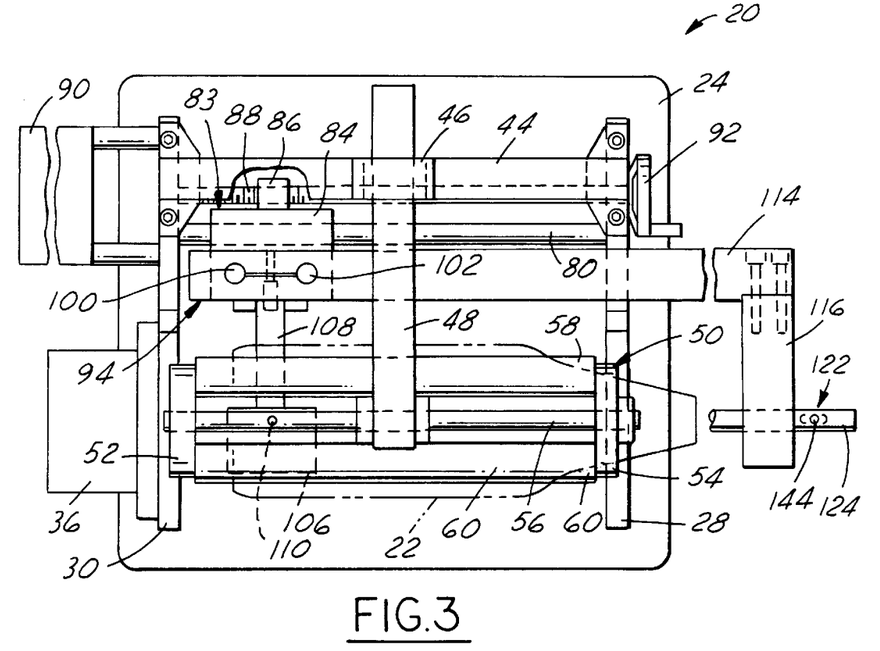
FIG. 3 is a top plan view of the apparatus illustrated in FIGS. 1 and 2.

Thus, with lock 70 pivoted to the position not shown in FIG. 2 and carriage assembly 50 moved away from rollers 32, 34, a container 22 may be positioned on rollers 32, 34 for testing. Lock 70 is then released to the position of FIG. 2 and carriage 50 is moved downwardly by spring 62 so as to engage container 22 and hold container 22 firmly against rollers 32, 34. The container may then be rotated about its central axis by means of motor 36 and drive belt 40, with rollers 58, 60 being freely rotatable to allow free container rotation. Spring 62 preferably is adjusted at 68, 69 so as not to place tension on arm 48 in the position of FIG. 2. Container 22 is held on rollers 32, 34 by the weight of carriage 50 and arm 48. The purpose of spring 62 is to place tension on arm 48 as it is moved upwardly by lock 70 to give the lock a positive feel.

A pair of vertically aligned horizontally oriented parallel rods 80, 82 extend between support plates 28, 30 at a position laterally spaced from rollers 32, 34. A horizontal carriage 83 comprises a block 84 having suitable bearings that support the carriage block for sliding movement on rods 80, 82 horizontally above support plate 24 and in a direction parallel to the axis of rotation of a container 22 carried by rollers 32, 34. A nut 86 couples carriage block 84 to a lead screw 88 that extends between support plates 28, 30 parallel to and horizontally aligned with slide shaft 82. Lead screw 88 is coupled at one end to a stepper motor 90 mounted on plate 30, and at an opposing end to a manual handle 92. Thus, carriage block 84 is movable horizontally along rods 80, 82 by stepper motor 90, or by handle 92 independent of stepper motor 90. A vertical carriage 94 is mounted for vertical movement on carriage 83. Carriage 94 includes an upper carriage block 96 and a lower carriage block 98, each fastened to a pair of parallel vertical rods 100, 102 that slidably extend through associated bearings in horizontal carriage block 84. A coil spring 104 (FIG. 4) is captured in compression between horizontal carriage block 84 and upper vertical carriage block 96. An electronic gauge 106 is carried by a bracket 108 cantilevered from lower vertical carriage block 98 so as to position gauge 106 beneath rollers 32, 34. Gauge 106 has a gauge pin 110 slidably carried within a tube 112 and extending vertically upwardly between rollers 32, 34 for exterior engagement with the sidewall or heel of a container 22 carried by rollers 32, 34. Gauge 106 provides an electrical output signal as a function of linear motion of finger 110, which in turn indicates container wall thickness as will be described. A button on gauge 106 provides for adjustment of the "zero" position of pin 110.

Figure 5:
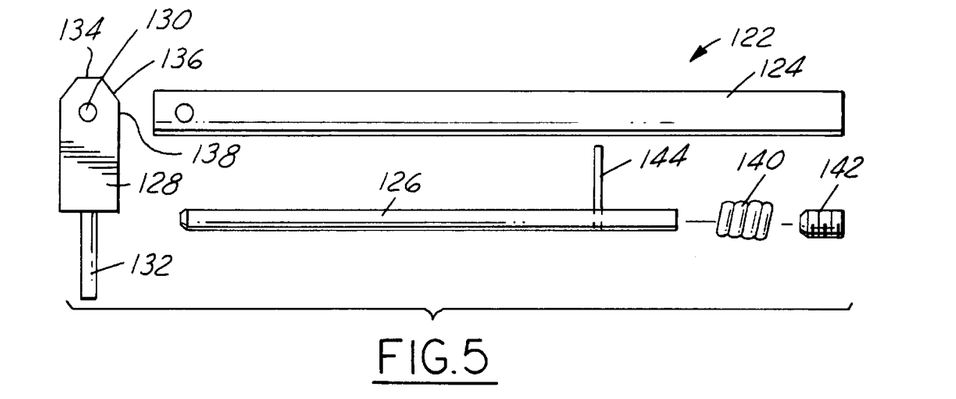
FIG. 5 is an exploded elevational view of the gauge probe assembly in the apparatus of FIGS. 1–4.
Figure 6A:
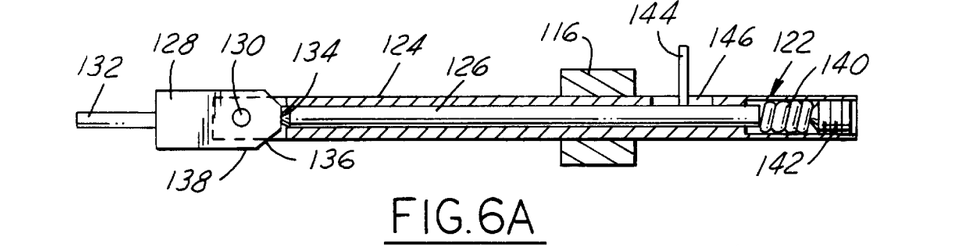
FIGS. 6A–6C are partially sectioned elevational views of the gauge probe assembly at different probe head orientations.
Figure 6B:
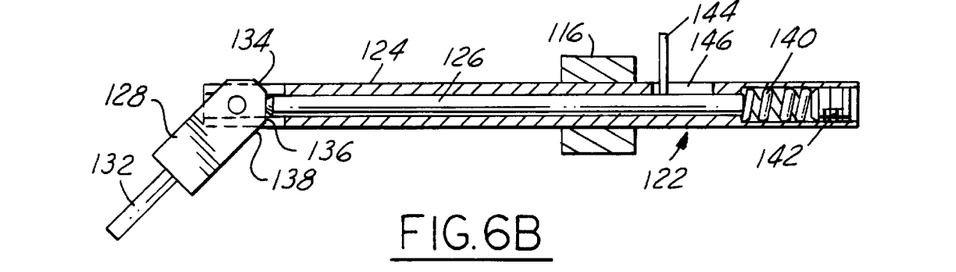
Figure 6C:
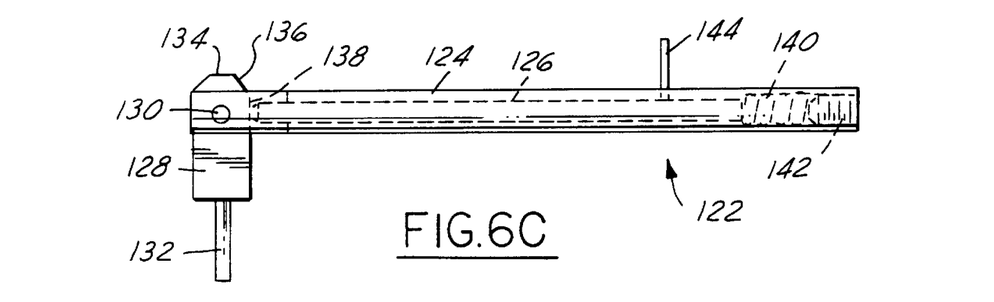

An elongated arm 114 is clamped to and extends horizontally from the upper ends of vertical carriage rods 100, 102 parallel to the axes of rollers 32, 34, thus moving up and down vertically with carriage 83. A cross-arm 116 extends laterally from the end of arm 114 remote from carriage rods 100, 102. The vertical position of arm 114 with respect to upper carriage plate 96 is adjustable by means of a screw 118 and a set of jam nuts 120 (FIG. 4). A probe assembly 122 is cantilevered from the free end of cross-arm 116. Referring to FIGS. 5–6C, probe assembly 122 includes a hollow probe tube 124 within which a probe arm rod 126 is slidably disposed. A probe head 128 is mounted by a pivot pin 130 at one end of tube 24. Head 128 has a tip 132 that extends therefrom for engagement with the interior surface of a container 22 under test. The end of head 128 remote from tip 132 has a flat surface 134 perpendicular to the axis of tip 132, and a pair of laterally opposed angulated surfaces 136 at a 45° angle with respect to the axis of tip 132. The side surfaces 138 of head 128 are parallel to the axis of tip 132.

Figure 14:
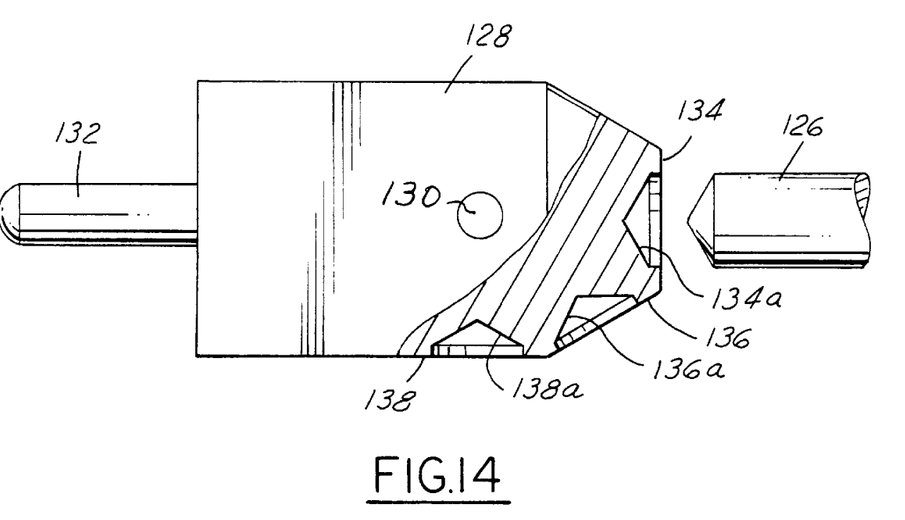
FIG. 14 is a view of a portion of FIG. 6A on an enlarged scale.

A coil spring 140 is captured in compression within one end of tube 124 by means of a screw 142, and engages the adjacent end of rod 126 so as to urge the opposing end rod into abutment with one of the surfaces 134, 136, 138 of head 128. The force of rod 126 against head 128 is adjustable by means of screw 142. A handle 144 is affixed to rod 126 adjacent to spring 140, and extends laterally through a slot 146 in the wall of tube 124. Thus, the angular orientation of head 128 with respect to the axis of tube 124 and rod 126 may be adjusted by moving handle 144 and rod 126 against the force of spring 140 until head 128 pivots about pin 130 to the desired angular orientation, and then releasing handle 144 and rod 126 so that the end of rod 126 holds head 128 in the desired angular orientation. Head 128 in the embodiment illustrated in FIGS. 5–6C may be oriented coaxial with arm 126 (FIG. 6A) by abutment of arm 126 with head surface 136, may be oriented at an angle of 45° (FIG. 6B) by abutment of arm 126 with a surface 136, and at an orientation of 90° (FIG. 6C) by means of abutment of arm 126 with a head surface 138. Surfaces 134, 136 and 138 have respective machined detent pockets 134a, 136a, 138a (FIG. 14) that received the end of rod 126 and lock head 128 in respective position.

Use of apparatus 20 for measurement of container sidewall thickness will first be described. With arm 48 and carriage assembly 50 pivoted upwardly and locked in position, and with probe head 128 oriented horizontally as illustrated in FIG. 6A, a container 22 is fitted over probe assembly 122 by receipt of the probe assembly into the container mouth, and the container is then placed upon rollers 32, 34. Carriage assembly 50 and arm 48 are then released by lock 70 so as to engage the container and hold the container firmly in position (FIG. 2). Probe assembly handle 144 is manipulated by an operator until head 128 and tip 132 are oriented at an angle of 90° (FIGS. 1–2, 4 and 6C) for internal radial engagement with the inside surface of the container sidewall. Probe assembly 122 is adjustably mounted on cross-arm 116 so that tip 132 of head 128 may be placed in radial opposition to finger 110 of gauge. Handle 92 is manipulated to bring horizontal carriage 83, tip 132 and finger 110 to the desired starting position. (Gauge 106 is preadjusted against head tip 132 to "zero" the gauge.) A spring within tube 112 holds finger 110 against the exterior surface of the container sidewall, and gauge 106 provides an electrical output signal as a function of separation between finger 110 and tip 132, and thus as a function of container sidewall thickness. It will also be noted at this point that spring 104 supports the weight of vertical carriage 94, gauge 106, arm 114, cross-arm 116 and probe assembly 122 so that the entire assembly is essentially free floating with respect to horizontal carriage 83.

Figure 7:
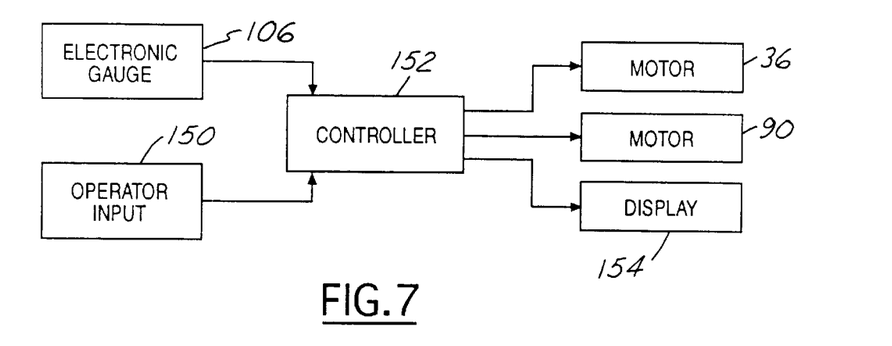
FIG. 7 is a functional block diagram of the electronics in the apparatus of FIGS. 1–4.
Figure 8:
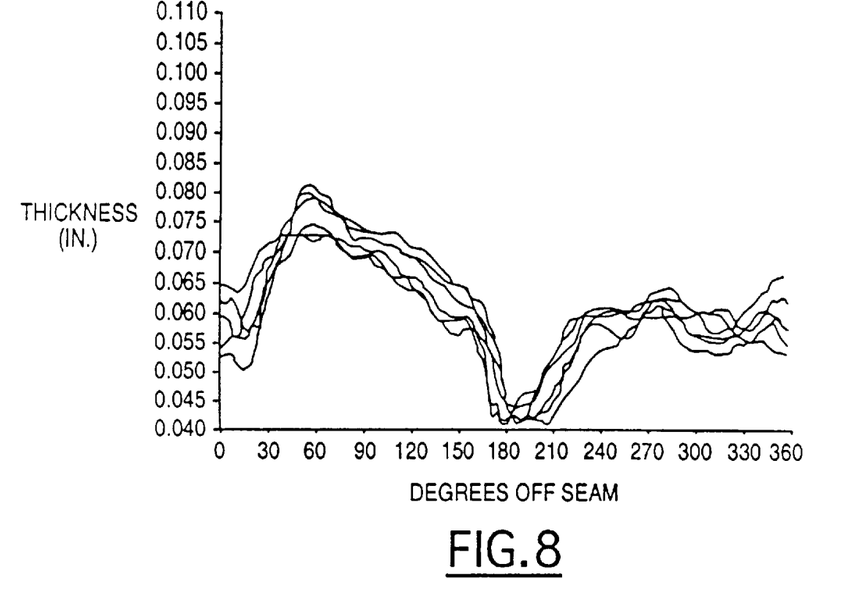
FIG. 8 is a graphic illustration of sidewall thickness measurements obtained employing the apparatus of FIGS. 1–7.

An operator input 150 (FIG. 7) is then provided to an electronic controller 152 for applying power to stepper motors 36, 90. Controller 152 receives electronic input signals from gauge 106 indicative of position of gauge finger 110, and provides a suitable output display 154 to an operator. Motor 36 is activated to rotate container 22 about its axis, and the output of gauge 106 is monitored by controller 52. Since probe assembly 122 and gauge 106 are both mounted on vertical carriage 94, the weight of which is supported by spring 104, movement of both the probe assembly and the gauge due to non-circularity of container 22 is ignored. On the other hand, any variation in sidewall thickness will cause gauge finger 110 to move relative to head tip 132, thereby causing gauge 106 to provide a varying output signal to controller 152. Controller 152 includes suitable memory for sampling and storing the gauge output at increments of container rotation. This may be accomplished by sampling and storing the gauge output signal at incremental steps of container rotation, or by sampling and storing the gauge output signal at equal time increments while the container is rotated at constant velocity. FIG. 8 is a graphic illustration of sidewall thickness versus angle of rotation, with the "zero" reference of angular rotation being taken at a mold seam of the container (which is set at the "zero" position by an operator). FIG. 8 illustrates data taken from a plurality of containers, all of which exhibit a thin section between about 180° and 210° from the mold seam, and a thick section at around 60° from the mold seam.

Figure 11:
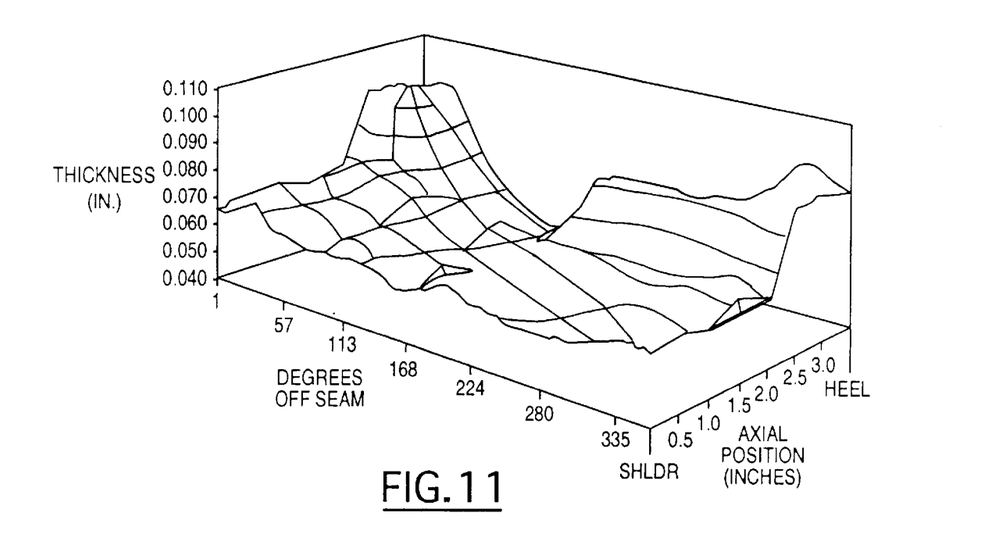
FIG. 11 is a three-dimensional graphic illustration of container wall measurements obtained in accordance with the present invention.

As the container 22 is rotated by stepper motor 36 and thickness data sampled and stored at increments of container rotation, stepper motor 90 moves the entire gauge assembly axially of the container. This is accomplished by means of lead screw 88, nut 86 and horizontal carriage block 84, on which the entire vertical carriage and gauge mechanism is mounted. Thus, as the container is rotated at relatively high speed, the gauge mechanism is moved horizontally at lower speed so as to obtain thickness readings around the container sidewall at differing increments of axial position. FIG. 11 illustrates a three-dimensional map of container sidewall thickness data by angular position with respect to the mold seam, and by axial position between the container shoulder and the container heel.

Figure 9:
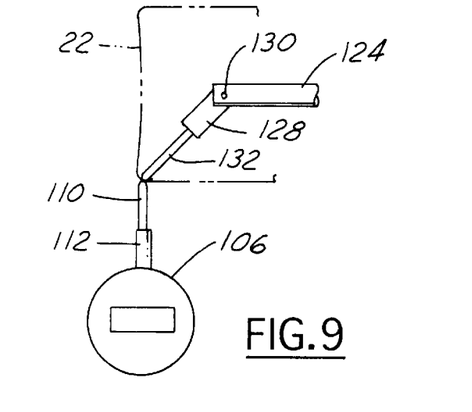
FIG. 9 is a fragmentary view that illustrates use of the apparatus of FIGS. 1–7 for measuring thickness of the container heel.
Figure 10:
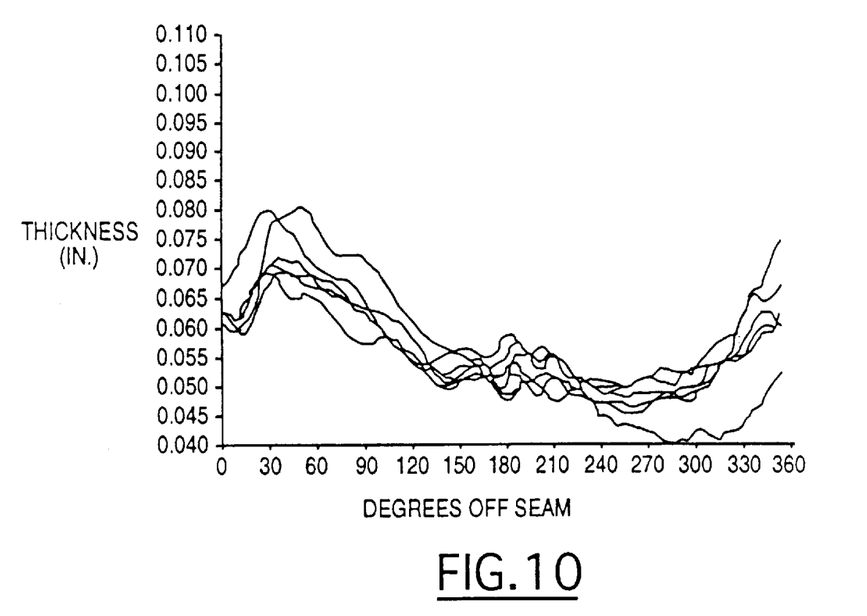
FIG. 10 is a graphic illustration of container heel measurements obtained in accordance with the apparatus of FIG. 9.

In accordance with another feature of the present invention, the apparatus may be employed for measuring thickness at the radius of the container heel, as illustrated in FIG. 9. This is accomplished by manipulation of probe assembly handle 144 until head 128 is oriented at 45° (FIG. 6B). The probe assembly is then moved within the container until tip 132 is nested in the inner radius of the container heel. (As noted above, probe assembly 122 is adjustably positionable on cross-arm 116.) This heel thickness measurement could not be accomplished employing the 90° orientation of the probe head (FIG. 6C) because of the slightly convex contour of the inside of the container bottom, as shown in FIG. 9. The container is then rotated about its axis, and measurements of heel thickness are obtained at increments of angular rotation. FIG. 10 illustrates heel thickness measurement data for the several containers of FIG. 8, again with angular reference to the container mold seam.

Figure 12:
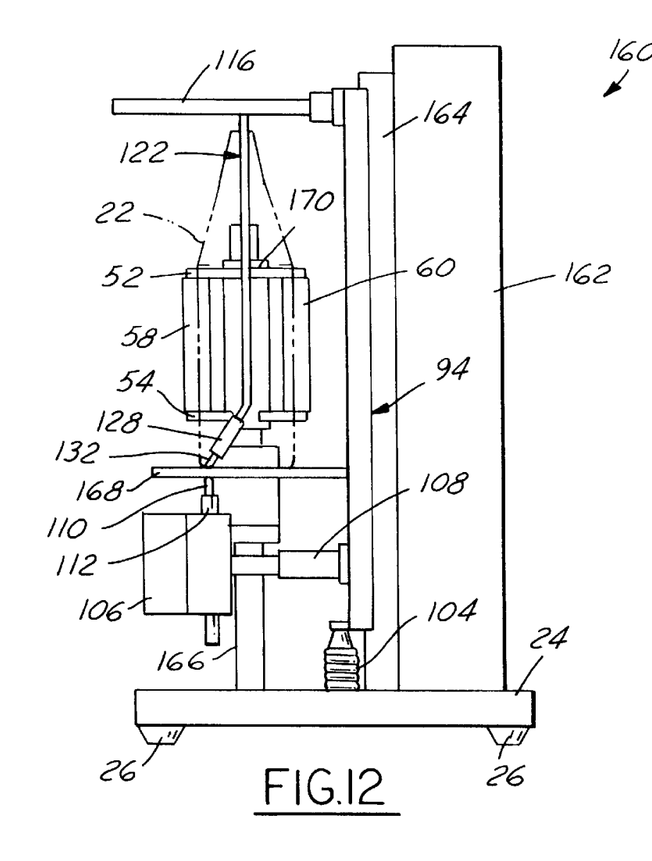
FIG. 12 is a side elevational view of an apparatus in accordance with a modified embodiment of the invention for measuring thickness of the load-bearing portion of the container.
Figure 13:
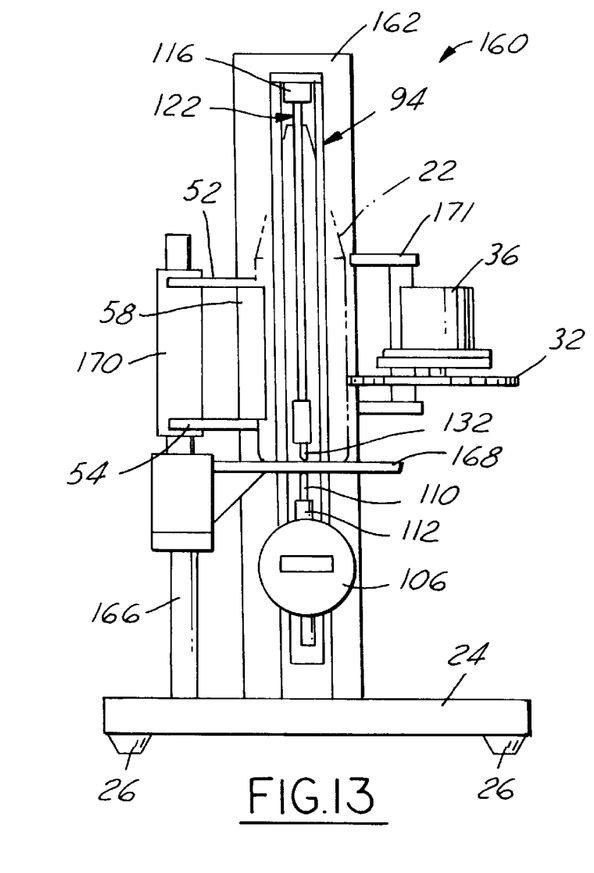
FIG. 13 is an end elevational view of the apparatus illustrated in FIG. 12.

FIGS. 12 and 13 illustrate a modified embodiment 160 of the present invention for measuring the thickness of the heel area at the bottom or load-bearing portion of the container heel. Elements in FIGS. 12–13 that are the same as or functionally similar to those discussed above are indicated by correspondingly identical reference numerals. A base plate 24 carries a vertical support 162 on which a vertical carriage 94 is mounted by means of a linear bearing 164. Carriage 94 carries gauge 106 by means of bracket 108, and carries probe arm assembly 122 by means of cross-bracket 116. A vertical stanchion 166 carries a slide plate 168 for vertically supporting a container 22, and a carriage 170 that mounts rollers 58, 60 for free rotation and engagement with the sidewall of container 22. Roller 32 is coupled to motor 36 mounted on support 162 by a bracket 171 for exteriorly engaging container 22 so as to hold container 22 against rollers 58, 60 and rotate the container about its vertically oriented central axis. Thus, as container 22 is rotated by motor 36 and roller 32 about its central axis, controller 152 (FIG. 7) obtains and stores signals from gauge 106 at increments of container rotation. Spring 104 supports the weight of carriage assembly 94 so that the carriage assembly may bodily move vertically in response to lack of flatness at the container bottom.

There have thus been disclosed an apparatus and method that fully satisfy all of the objects and aims set forth above. The apparatus and method automatically obtain two- and/or three-dimensional profiles of container thickness information. The apparatus and method are adapted to obtained thickness measurements of the sidewall and heel of the container, and of the load-bearing portion of the container bottom. The apparatus and method of the invention may be readily implemented in a manufacturing environment.

In accordance with a first aspect of the invention, the container drive rollers 32, 34 are driven by a stepper motor 36. The stepper motor and electronic gauge are coupled to external control and memory electronics 152 for reading the thickness gauge at periodic increments of stepper motor rotation of the rollers, and thereby obtaining a table of data that relates wall thickness to angular position. Thus, rather than simply having maximum and minimum thickness data with no angular position indication, an operator may now obtain thickness data related to angular orientation (e.g., with respect to the mold seam of the container) that can be analyzed to identify specific processing problems at the manufacturing stages.

In accordance with another feature of the invention, the vertical carriage assembly 94 that mounts the electronic gauge and probe assembly is itself coupled by a lead screw 88 to a second stepper motor 90. The second stepper motor is also coupled to the control and data storage electronics 152. With this arrangement, wall thickness data can be read not only entirely around the container by angular increment, but also lengthwise of the container by axial increment. A three-dimensional table of thickness data is thus obtained.

The probe head 128 on the probe arm assembly 122 can be latched in any of three angular positions. The head may be latched in the horizontal position (FIG. 6A) to permit insertion into and extraction from the mouth of the container. The head can be latched in the 90° position (FIG. 6C) for opposed radial measurement of sidewall thickness in combination with the electronic gauge. Head 138 can also be latched in the 45° position (FIG. 6B) for cooperating with the electronic gauge to measure thickness at the heel. With the head at the 45° angle, the head may now be placed against the inside curve of the container heel without interfering with the convex interior of the container bottom. The embodiment of FIGS. 12–13 provide vertical container orientation and rotation by a stepper motor. The probe assembly 122 that is inserted into the container has an angulated head 128 that cooperates with the opposing electronic gauge 106 for measuring thickness of the load bearing portion of the container bottom.

I claim:

1. Apparatus for measuring wall thickness of a container having a sidewall, a central axis and an open mouth, said apparatus comprising:

a pair of spaced rollers, including means for mounting said rollers for free rotation, means for holding the sidewall of a container exteriorly against said rollers and rotating the container about its central axis, gauge means that includes first means for engaging an exterior point on the container, second means for extending through the container mouth and engaging an interior point on the container opposed to said exterior point such that separation between said first and second means varies as a function of container wall thickness between said first and second points, and third means operatively coupled to said first and second means for providing an electrical signal as a function of such wall thickness, and control means coupled to said gauge means and said rotating means, and responsive to said electrical signal, for obtaining and storing a data map of wall thickness between said points as a function of increments of rotation of the container.

2. The apparatus set forth in claim 1 wherein said gauge means includes a carriage and means mounting said carriage for motion orthogonal to the wall thickness being measured, said first and second means being mounted on said carriage for conjoint motion such that variations in position of the container wall thickness being measured results in conjoint motion of said first and second means on said carriage.

3. The apparatus set forth in claim 2 further comprising means for resiliently supporting said carriage against gravity.

4. The apparatus set forth in claim 3 wherein said resiliently supporting means comprises a coil spring.

5. The apparatus set forth in claim 2 wherein second means comprises an elongated arm for extending through the mouth of the container and a head coupled to said arm for engaging said interior point on the container.

6. The apparatus set forth in claim 5 wherein said head is movably coupled to said arm for movement between at least a first position coaxial with said arm for insertion though the container mount and a second position at an angle to said arm for engaging the interior of a container wall.

7. The apparatus set forth in claim 6 wherein said second means further comprises a tube within which said arm is slidably mounted, said head being pivotally mounted on said tube and having means for engaging said arm so as to hold said head at at least said first and second positions.

8. The apparatus set forth in claim 7 wherein said second means further comprises spring means within said tube for urging said arm against said head.

9. The apparatus set forth in claim 8 wherein said head has plural surfaces at differing angular positions, said spring means functioning through said arm to engage and selectively hold said head at differing angular positions with respect to said tube corresponding to said differing angular positions of said head surfaces.

10. The apparatus set forth in claim 9 wherein said spring means comprises a coil spring captured in compression at an end of said tube remote from said head.

11. The apparatus set forth in claim 10 wherein said spring means further comprises means for selectively adjusting compressive stress in said spring.

12. The apparatus set forth in claim 9 wherein said second means further comprises a handle coupled to said arm and extending through said tube for operator movement of said arm against said spring means to adjust position of said head.

13. The apparatus set forth in claim 9 wherein said head has a detent pocket on each of said surfaces for receiving an end of said arm to lock said head in position.

14. The apparatus set forth in claim 5 wherein said head is fixedly mounted on said arm.

15. The apparatus set forth in claim 14 wherein said head is fixedly mounted on said arm at an angle to said arm for engaging an interior surface of a load-bearing portion of a container.

16. The apparatus set forth in claim 2 wherein said means for rotating said container comprises a stepper motor, and wherein said control means comprises means for obtaining and storing a data map of wall thickness versus increments of rotation of said stepper motor.

17. The apparatus set forth in claim 16 wherein said pair of rollers and said holding and rotating means are disposed to hold the container in horizontal orientation for measuring wall thickness of the sidewall or heel of the container.

18. The apparatus set forth in claim 16 wherein said pairs of rollers and said holding and rotating means are disposed to hold the container in vertical orientation for measuring wall thickness of the bottom of the container.

19. Apparatus for measuring sidewall thickness of a container having an open mouth, which comprises:

means including a first motor for holding a container while rotating the container about its axis, gauge means for engaging opposed interior and exterior points on the sidewall of a container in said holding and rotating means, and providing an electrical signal as a function of container sidewall thickness between said points, means including a second motor coupled to said gauge means for moving said gauge means in the direction of said axis, and control means coupled to said first and second motors, and responsive to said electrical signal, for obtaining and storing a three-dimensional data map of thickness between said points at increments of motion at both of said first and second motors.

20. The apparatus set forth in claim 19 wherein said gauge means comprises:

a first carriage, means for mounting said first carriage for motion in the direction of the axis of a container in said holding means, and means for coupling said first carriage to second motor, a second carriage mounted on said first carriage for motion orthogonal to the containers axis, and means on said second carriage for engaging said opposed points on the container.

21. The apparatus set forth in claim 20 further comprising spring means for supporting said second carriage with respect to said first carriage such that said second carriage is free to move with variations in circularity of the container sidewall.

22. The apparatus set forth in claim 21 wherein said spring means comprises a coil spring captured in compression between said first and second carriages.

23. The apparatus set forth in claim 20 wherein said means on said second carriage includes first means for engaging an exterior point on the container sidewall, second means for extending through the container mouth and engaging an interior point on the container sidewall radially opposed to said exterior point such that separation between said first and second means varies as a function of container sidewall thickness between said first and second points, and third means operatively coupled to said first and second means for providing said electrical signal.

24. The apparatus set forth in claim 23 wherein second means comprises an elongated arm for extending through the mouth of the container and a head coupled to said arm for engaging said interior point on the container.

25. The apparatus set forth in claim 24 wherein said head is movably coupled to said arm for movement between at least a first position coaxial with said arm for insertion though the container mount and a second position at an angle to said arm for engaging the interior of a container wall.

26. The apparatus set forth in claim 25 wherein said second means further comprises a tube within which said arm is slidably mounted, said head being pivotally mounted on said tube and having means for engaging said arm so as to hold said head at at least said first and second positions.

27. The apparatus set forth in claim 26 wherein said second means further comprises spring means within said tube for urging said arm against said head.

28. The apparatus set forth in claim 27 wherein said head has plural surfaces at differing angular positions, said spring means functioning through said arm to engage and selectively hold said head at differing angular positions with respect to said tube corresponding to said differing angular positions of said head surfaces.

29. The apparatus set forth in claim 28 wherein said spring means comprises a coil spring captured in compression at an end of said tube remote from said head.

30. The apparatus set forth in claim 29 wherein said spring means further comprises means for selectively adjusting compressive stress in said spring.

31. The apparatus set forth in claim 28 wherein said second means further comprises a handle coupled to said arm and extending through said tube for operator movement of said arm against said spring means to adjust position of said head.

32. The apparatus set forth in claim 27 wherein said head has a detent pocket on each of said surfaces for receiving an end of said arm to lock said head in position.

33. The apparatus set forth in claim 24 wherein said head is fixedly mounted on said arm.

34. The apparatus set forth in claim 33 wherein said head is fixedly mounted on said arm at an angle to said arm for engaging an interior surface of a load-bearing portion of a container.

35. The apparatus set forth in claim 20 wherein means for holding and rotating the container comprises a pair of spaced parallel rollers and means coupling said rollers to said first motor.

36. The apparatus set forth in claim 35 wherein said means coupling said rollers to said first motor comprises a drive belt.

37. The apparatus set forth in claim 35 further comprising means for holding a container against said rollers, and means for selectively releasing said holding means for positioning a container on said rollers.

38. The apparatus set forth in claim 37 wherein said holding means comprises a second pair of parallel rollers, a roller carriage carrying said second pair of rollers, and means for selectively moving said roller carriage into and out of position opposed to the first pair of rollers.

39. The apparatus set forth in claim 38 further comprising means for resiliently urging said roller carriage toward the first pair of rollers for holding a container between the rollers.

40. The apparatus set forth in claim 20 wherein said means coupling said first carriage to said second motor comprises a lead screw.

41. The apparatus set forth in claim 40 further comprising a handle coupled to said lead screw for manually positioning said first carriage independent of said second motor.

42. The apparatus set forth in claim 20 wherein said first and second motors comprise stepper motors.

43. A method of measuring sidewall thickness of a container that comprises the steps of:

(a) rotating the container about its central axis, (b) during said step (a), engaging the container sidewall at radially opposed interior and exterior points at sequentially differing positions lengthwise of the container axis, and (c) obtaining and storing a data map of sidewall thickness between said points at increments of rotation about said axis and position lengthwise of said axis.

44. The method set forth in claim 43 wherein said step (b) comprises the steps of: (b1) mounting a gauge on a carriage, and (b2) moving the carriage parallel to said axis.

45. The method set forth in claim 44 wherein the step (b1) comprises the steps of mounting the gauge on a first carriage, mounting the first carriage on a second carriage for movement orthogonal to the container axis, and mounting the second carriage for movement parallel to said axis.

46. The method set forth in claim 45 comprising the additional step of resiliently supporting said first carriage on said second carriage.

47. The method set forth in claim 46 wherein said step (b1) comprises the additional steps of providing first gauge means on said first carriage for engaging an exterior point on the container, and providing second gauge means on said first carriage for extending through a mouth of the container and engaging an interior point on the container opposite said exterior point.

\* \* \* \* \*